United States Patent
Cheng et al.

(10) Patent No.: US 11,558,134 B2
(45) Date of Patent: Jan. 17, 2023

(54) WIRELESS COMMUNICATION APPARATUS HAVING MEMORY SHARING MECHANISM AND MEMORY SHARING METHOD OF THE SAME

(71) Applicant: REALTEK SEMICONDUCTOR CORPORATION, Hsinchu (TW)

(72) Inventors: Shau-Yu Cheng, Hsinchu (TW); Ting-Chen Wei, Hsinchu (TW); Jyun-Jhe Jheng, Hsinchu (TW); Chun-Kai Tseng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 26 days.

(21) Appl. No.: 17/466,264

(22) Filed: Sep. 3, 2021

(65) Prior Publication Data
US 2022/0190942 A1    Jun. 16, 2022

(30) Foreign Application Priority Data
Dec. 14, 2020 (TW) .................. 109144120

(51) Int. Cl.
*H04B 17/382* (2015.01)
*H04B 17/391* (2015.01)
*H04B 17/318* (2015.01)

(52) U.S. Cl.
CPC ......... *H04B 17/382* (2015.01); *H04B 17/318* (2015.01); *H04B 17/391* (2015.01)

(58) Field of Classification Search
CPC .. H04B 17/382; H04B 17/318; H04B 17/391; H04B 7/0452; H04B 7/0626; Y02D 30/70; H04L 1/0026; H04W 28/06
See application file for complete search history.

(56) References Cited

U.S. PATENT DOCUMENTS 10,310,734 B2    6/2019  Tanzawa
2012/0170641 A1*  7/2012  Hatakawa ............ H04L 1/0029
                                                  375/240
(Continued)

FOREIGN PATENT DOCUMENTS

CN    109565382 A    4/2019
CN    111314034 A    6/2020
(Continued)

OTHER PUBLICATIONS

Liu et al., Reducing On-chip Memory for Massive MIMO Baseband processing using Channel Compression, IEEE, 2017 (Year: 2017).*
(Continued)

*Primary Examiner* — Quoc Thai N Vu
(74) *Attorney, Agent, or Firm* — WPAT, PC

(57) ABSTRACT

The present invention discloses a wireless communication apparatus having memory sharing mechanism that includes a communication circuit, a memory circuit and a processing circuit. The processing circuit performs the steps outlined below. Remote wireless communication apparatuses are connected to perform channel detection and communication thereon by a communication circuit. Compressed channel state information (CSI) generated by the remote wireless communication apparatuses is received by the communication circuit. The compressed CSI is stored in the memory circuit. Raw CSI is generated according to a status of the wireless channel. When a remaining capacity of the memory circuit is not sufficient, a number of the remote wireless communication apparatuses that the communication circuit performs the channel detection thereon is decreased and the corresponding compressed CSI stored in the memory circuit is removed. The raw CSI is stored in the memory circuit.

18 Claims, 3 Drawing Sheets

(56) References Cited

U.S. PATENT DOCUMENTS

| 2014/0016631 | A1* | 1/2014 | Isonuma | H04W 4/18 |
| | | | | 370/338 |
| 2014/0369302 | A1* | 12/2014 | Abraham | H04L 1/0026 |
| | | | | 370/329 |
| 2020/0186224 | A1 | 6/2020 | Ahmed Salem et al. | |
| 2020/0322887 | A1 | 10/2020 | Pao et al. | |

FOREIGN PATENT DOCUMENTS

| CN | 111800804 A | 10/2020 |
| TW | 201640321 A | 11/2016 |

OTHER PUBLICATIONS

OA letter of the counterpart TW application (appl. No. 109144120) dated Nov. 16, 2021. Summary of the OA letter: 1 Claims 1 and 6~10 are rejected as allegedly being unpatentable in view of (CN 109565382 A), (CN 111314034 A, also published as U.S. Pat. No. 2020186224A1), (CN 111800804 A, also published as US2020322887A1).

* cited by examiner

WIRELESS COMMUNICATION APPARATUS HAVING MEMORY SHARING MECHANISM AND MEMORY SHARING METHOD OF THE SAME

BACKGROUND OF THE INVENTION

1. Field of the Invention

The present invention relates to a wireless communication apparatus having memory sharing mechanism and a memory sharing method of the same.

2. Description of Related Art

In wireless communication technology, e.g., WiFi technology, a wireless communication apparatus may perform measurement on a preamble signal delivered by a transmission terminal to estimate a frequency response of orthogonal sub-carriers of the system, which is known as channel state information (CSI). Each of the sub-carriers corresponds to one piece of estimated CSI in a form of a complex number. In current communication systems, the station apparatus performs estimation on the channel by using the detection packets delivered by the access point apparatus, performs matrix decomposition and compression on the channel information to generate compressed channel state information, and transmits such information back to the access point apparatus. The access point apparatus determines the wireless channel between the access point apparatus and the station apparatus to improve the transmission efficiency.

In recent years, the raw CSI is often used to determine a channel response variation generated due to indoor environment change. However, the data amount of the raw CSI is not compressed and is much larger than the data amount of the compressed CSI. A method to efficiently and elastically store the compressed CSI and the raw CSI becomes critical in the design of the communication apparatus.

SUMMARY OF THE INVENTION

In consideration of the problem of the prior art, an object of the present invention is to provide a wireless communication apparatus having memory sharing mechanism and a memory sharing method of the same.

The present invention discloses a wireless communication apparatus having memory sharing mechanism that includes a communication circuit, a memory circuit and a processing circuit. The processing circuit is configured to execute steps outlined below. A plurality of remote wireless communication apparatuses is connected to perform channel detection and communication respectively through a wireless channel by a communication circuit. A plurality of pieces of compressed CSI (compressed CSI) generated by the remote wireless communication apparatuses based on a status of the wireless channel are received by the communication circuit. The compressed CSI is stored in the memory circuit. Raw channel state information (raw CSI) is generated according to a status of the wireless channel A channel detection number of the remote wireless communication apparatuses that the communication circuit performs the channel detection is decreased when a remaining capacity of the memory circuit is not sufficient, and the corresponding compressed CSI stored in the memory circuit is removed. The raw CSI is stored in the memory circuit.

The present invention also discloses a memory sharing method used in a wireless communication apparatus that includes steps outlined below. A plurality of remote wireless communication apparatuses is connected to perform channel detection and communication respectively through a wireless channel by a processing circuit by using a communication circuit. A plurality of pieces of compressed CSI generated by the remote wireless communication apparatuses based on a status of the wireless channel are received by the processing circuit by using the communication circuit. The compressed CSI is stored in a memory circuit by the processing circuit. Raw CSI is generated according to a status of the wireless channel by the processing circuit. A channel detection number of the remote wireless communication apparatuses that the communication circuit performs the channel detection by the processing circuit is decreased when a remaining capacity of the memory circuit is not sufficient, and the corresponding compressed CSI stored in the memory circuit is removed by the processing circuit. The raw CSI is stored in the memory circuit by the processing circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a wireless communication apparatus having memory sharing mechanism and a memory sharing method of the same to store the compressed CSI and the raw CSI in a single memory circuit in an elastic and efficient way to accomplish the memory sharing mechanism.

Figure 1:
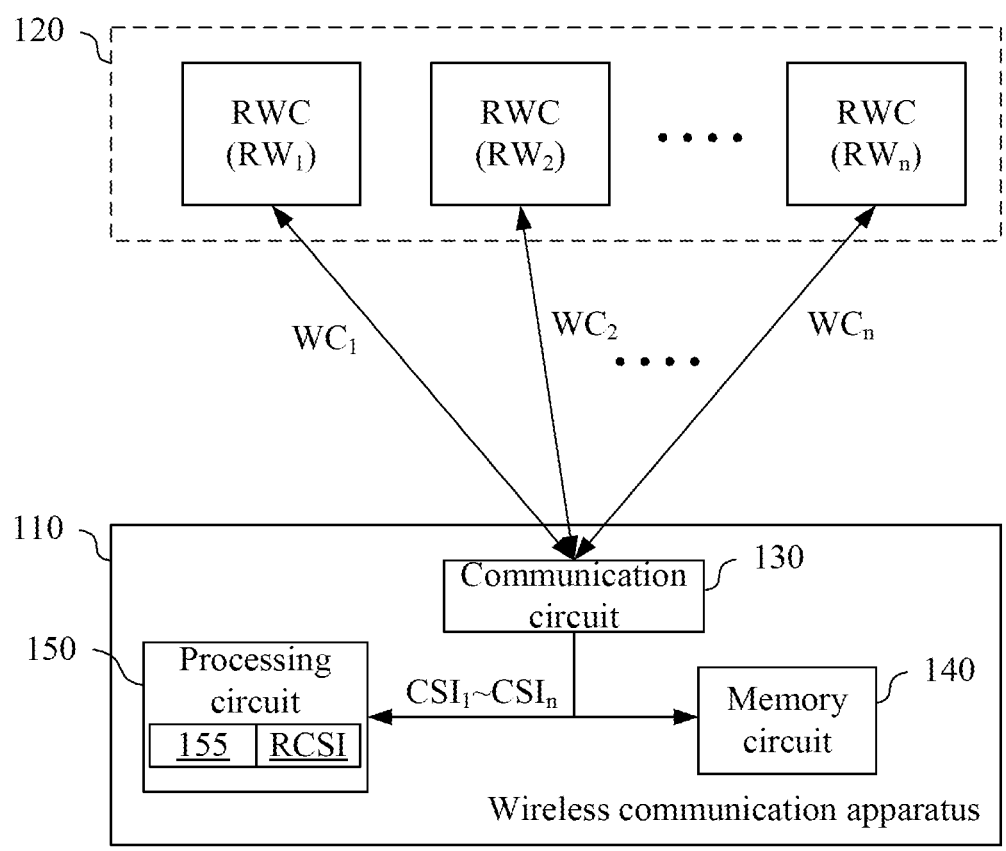
FIG. 1 illustrates a diagram of a wireless network system according to an embodiment of the present invention.

Reference is now made to FIG. 1. FIG. 1 illustrates a diagram of a wireless network system 100 according to an embodiment of the present invention.

The wireless network system 100 includes a wireless communication apparatus 110 and a plurality of remote wireless communication apparatuses 120. In an embodiment, the wireless communication apparatus 110 is an access point (AP) apparatus. Each of the remote wireless communication apparatuses 120 is a station apparatus. The wireless communication apparatus 110 and the remote wireless communication apparatuses 120 (abbreviated as RWC in FIG. 1) are connected to perform channel detection and communication.

The wireless communication apparatus 110 includes a communication circuit 13, a memory circuit 140 and a processing circuit 150.

The communication circuit 130 can be any circuit configured to perform communication with the remote wireless communication apparatuses 120 through wireless communication protocols by using such as, but not limited to multi-user multi-input/multi-output (MU-MIMO) and/or transmit beamforming (TxBF) technologies. In an embodiment, a number of the remote wireless communication apparatuses 120 is n. In FIG. 1, the remote wireless communication apparatuses 120 are separately labeled as $RW_1 \sim RW_n$.

The memory circuit 140 can be any storage device used to store data, such as but not limited to a random access memory (RAM), a read only memory (ROM) or a hard disk. It is appreciated that in different embodiments, the memory circuit 140 may include only one of the storage devices described above or include a multiple of the storage devices described above to store different types of data.

The processing circuit 150 is electrically coupled to the communication circuit 130 and the memory circuit 140. In an embodiment, processing circuit 150 is configured to execute computer executable commands 155. The computer executable commands 155 can be stored in the memory circuit 140 or other memories included in the wireless communication apparatus 110 so as to be retrieved and executed by the processing circuit 150. The computer executable commands 155 may include such as, but not limited to firmware/driver and related commands of hardware modules, e.g., the communication circuit 130 and the memory circuit 140 to access the signal or data of the communication circuit 130 and the memory circuit 140 to perform operation to further execute the function of the wireless communication apparatus 110. In another embodiment, the processing circuit 150 can be implemented by hardware circuits, e.g. an application specific integrated circuit (ASIC).

The operation of the wireless communication apparatus 110 is further described in the following paragraphs.

In an embodiment, the remote wireless communication apparatuses 120 is connected by the processing circuit 150 by using the communication circuit 130 to perform communication through the wireless channels $WC_1 \sim WC_n$ respectively, in which the wireless channels $WC_1 \sim WC_n$ may include uplink channels (that perform data transmission from the remote wireless communication apparatuses 120 to the wireless communication apparatus 110) and downlink channels (that perform data transmission from the wireless communication apparatus 110 to the remote wireless communication apparatuses 120). Each of the remote wireless communication apparatuses 120 labeled as $RW_1 \sim RW_n$ corresponds to one of the wireless channels $WC_1 \sim WC_n$.

A plurality of pieces of compressed channel state information $CSI_1 \sim CSI_n$, generated by the remote wireless communication apparatuses 120 based on a status of the wireless channels $WC_1 \sim WC_n$ are received by the processing circuit 150 by using the communication circuit 130 through a channel detection protocol. A plurality of pieces of compressed channel state information $CSI_1 \sim CSI_n$ are generated by the remote wireless communication apparatuses 120 based on a status of the wireless channels $WC_1 \sim WC_n$ through a channel detection protocol. Further, the plurality of pieces of compressed channel state information $CSI_1 \sim CSI_n$ are received by the processing circuit 150 by using the communication circuit 130. Each of the remote wireless communication apparatuses 120 labeled as $RW_1 \sim RW_n$ corresponds to one of the compressed channel state information $CSI_1 \sim CSI_n$.

In an embodiment, the compressed channel state information $CSI_1 \sim CSI_n$ is generated by the remote wireless communication apparatuses 120 according to the status of the wireless channels $WC_1 \sim WC_n$ after the processing circuit 150 transmits a driving packet (not illustrated in the figure) through the communication circuit 130 to the remote wireless communication apparatuses 120. In an embodiment, the remote wireless communication apparatuses 120 generate the channel state information in the form of matrixes first according to the status of the wireless channels $WC_1 \sim WC_n$, perform singular value decomposition (SVD) on the matrixes to obtain V matrixes and further compress the V matrixes to generate the compressed channel state information $CSI_1 \sim CSI_n$.

Under such a condition, the remote wireless communication apparatuses 120 obtains the compressed channel state information $CSI_1 \sim CSI_n$ that corresponds to downlink communication relative to the wireless communication apparatus 110.

In an embodiment, the processing circuit 150 may transmit the driving packets periodically to the remote wireless communication apparatuses 120, such that the remote wireless communication apparatuses 120 generate the compressed channel state information $CSI_1 \sim CSI_n$ periodically.

The compressed channel state information $CSI_1 \sim CSI_n$ can be used by the processing circuit 150 to determine the communication quality between the wireless communication apparatus 110 and the remote wireless communication apparatuses 120 to perform communication accordingly. As a result, the processing circuit 150 stores the compressed channel state information $CSI_1 \sim CSI_n$ in the memory circuit 140 such that the information can be accessed when needed.

Figure 2:
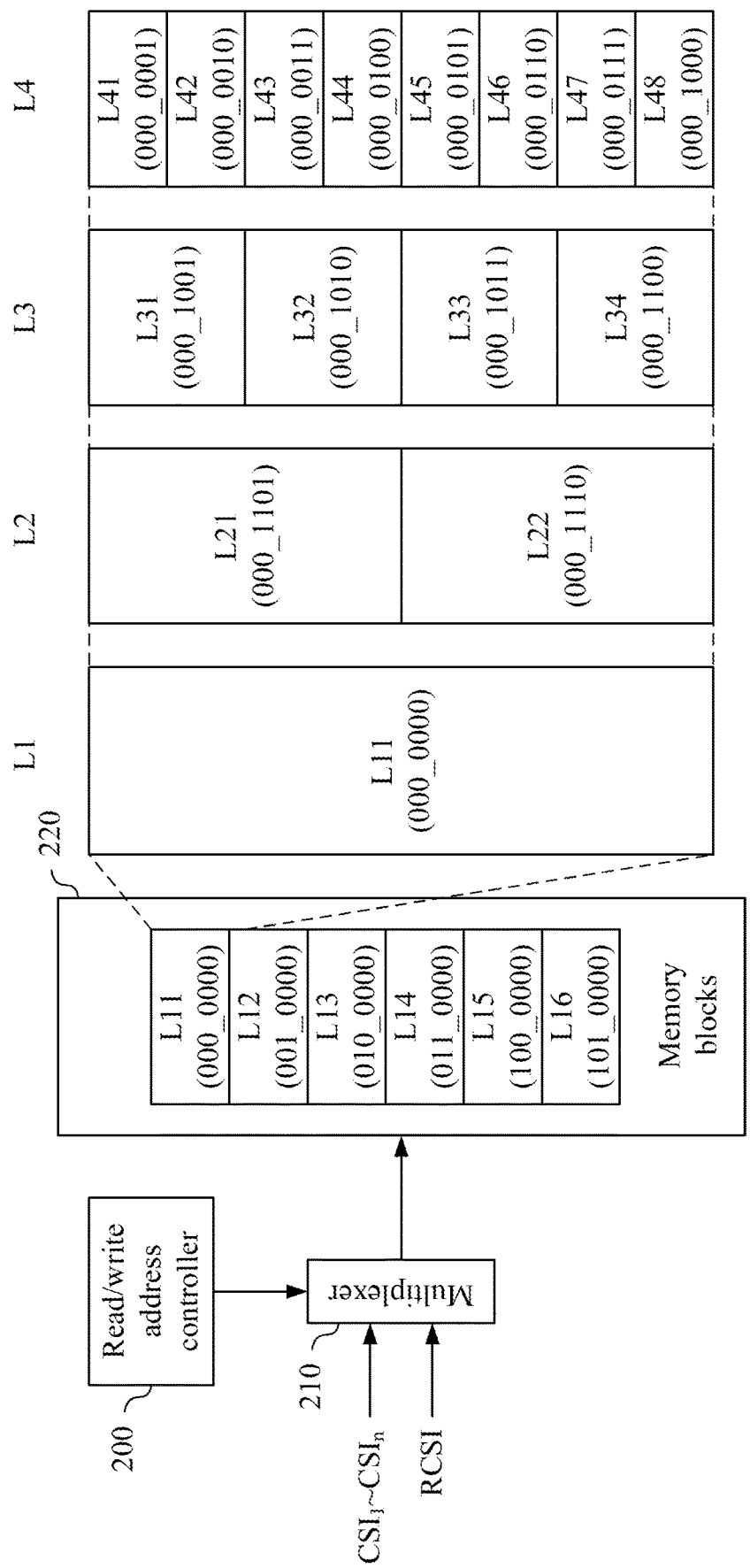
FIG. 2 illustrates a diagram of the memory circuit according to an embodiment of the present invention.

Reference is now made to FIG. 2. FIG. 2 illustrates a diagram of the memory circuit 140 according to an embodiment of the present invention.

In an embodiment, the memory circuit 140 includes read/write address controller 200, a multiplexer 210 and a plurality of memory blocks 220.

In an embodiment, the read/write address controller 200 is electrically coupled to the processing circuit 150 to receive the command (not illustrated in the figure) from the processing circuit 150. The processing circuit 150 controls the read/write address controller 200 to access the memory blocks 220 according to an address by delivering the command that includes the address.

The multiplexer 210 is electrically coupled to the communication circuit 130 and the processing circuit 150 to selectively transmit the data from the communication circuit 130 and the processing circuit 150 to the memory blocks 220 according to the address.

In an embodiment, the memory blocks 220 can be divided into a plurality of memory hierarchies. Each of the memory blocks included in the N-th memory hierarchy are composed by the memory blocks included in the N−1-th memory hierarchy.

Take the memory circuit 140 in FIG. 2 as an example, the memory blocks 220 includes four memory hierarchies L1~L4. The memory blocks 220 are separately labeled to describe the structure of the memory hierarchies L1~L4.

The memory hierarchies L1 include 6 memory blocks L11~L16. In order to keep the figure clear, only the structure of the memory blocks L11 is illustrated in detail in FIG. 2.

In the memory hierarchy L2, two memory blocks L21~L22 are grouped to form the memory blocks L11. In the memory hierarchy L3, two memory blocks L31 and L32 are grouped to form the memory block L21, and two memory blocks L33 and L34 are grouped to form the memory block L22. In the memory hierarchy L4, two of the memory blocks L41~L48 are grouped to form one of the memory blocks L31~L34.

It is appreciated that when a memory block in the higher memory hierarchies is used to store data, the memory blocks in the lower memory hierarchies included in such a memory block are not able to be used to store data.

In an embodiment, each of the addresses of the memory blocks in the memory circuit 140 is labeled as a code having a plurality of bits. The memory blocks in the higher memory hierarchies corresponding to the higher order bits and/or a larger code number (e.g., the most significant bit), and the memory blocks in the lower memory hierarchies corresponding to the lower order bits and/or a smaller code number (e.g., the least significant bit).

Take the memory circuit 140 in FIG. 2 as an example, each of the memory blocks is labeled as a code having 7 bits. For example, the codes of the memory blocks L41~L48 are 000_0001~000_1000. The codes of the memory blocks L31~L34 are 000_1001~000_1100. The codes of the memory blocks L21~L22 are 000_1101~000_1110. As a result, the memory blocks in the lower memory hierarchies corresponding to the lower order bits and/or a smaller code number. The memory blocks in the higher memory hierarchies corresponding to the higher order bits and/or a larger code number.

In an embodiment, the highest memory hierarchy L1 can be labeled by only the higher order bits. The codes of the memory blocks L11~L16 are labeled as 000_0000~101_0000.

The processing circuit 150 is configured to access the memory circuit 140 according to the codes of the memory blocks. In an embodiment, the compressed channel state information $CSI_1$~$CSI_n$ has a data amount. The size of the data amount may be different due to different antenna numbers and different bandwidths of the corresponding remote wireless communication apparatuses 120. As a result, the processing circuit 150 may select the memory blocks having the capacity matching the data amount of each of the compressed channel state information $CSI_1$~$CSI_n$ so as to store the compressed channel state information $CSI_1$~$CSI_n$. By using such a mechanism, the processing circuit 150 can make use of the memory circuit 140 in a more elastic and efficient way.

In an embodiment, the data amount of the compressed channel state information $CSI_1$~$CSI_n$ is smaller. The processing circuit 150 can select the memory blocks from the lower memory hierarchies, e.g. one of the memory blocks L41~L48 in the memory hierarchy L4, or one of the memory blocks L31~L34 in the memory hierarchy L3, to store the compressed channel state information $CSI_1$~$CSI_n$.

Besides, the processing circuit 150 itself can generate the raw CSI according to the status of the wireless channels $WC_1$~$WC_n$. In an embodiment, the raw CSI is generated based on channel detection performed on packets transmitted in the uplink channels (from the remote wireless communication apparatuses 120 to the wireless communication apparatus 110). The raw channel state information RCSI can be used to perform object displacement detection corresponding to an environment by the processing circuit 150. As a result, the processing circuit 150 stores the raw channel state information RCSI in the memory circuit 140 such that the information can be accessed when needed.

In an embodiment, the raw channel state information RCSI has a data amount. The processing circuit 150 may select the memory blocks having the capacity matching the data amount of the raw channel state information RCSI so as to store the raw channel state information RCSI.

However, the data amount of the raw channel state information RCSI is larger than the data amount of each of the compressed channel state information $CSI_1$~$CSI_n$. As a result, the processing circuit 150 has to select the memory blocks in the higher memory hierarchies, such as but not limited to one of the memory blocks L21~L22 in the memory hierarchy L2, or one of the memory blocks L11~L16 in the memory hierarchy L1, to store the raw channel state information RCSI.

In practical application, when the number of the remote wireless communication apparatuses 120 ($RW_1$~$RW_n$) that the communication circuit 130 is connected to is more, the number of the pieces of the compressed channel state information $CSI_1$~$CSI_n$ that needs to be stored is more. As a result, when the raw channel state information RCSI having the larger data amount is going to be stored, the processing circuit 150 determines whether a remaining capacity of the memory circuit 140 is sufficient for storing the raw channel state information RCSI.

When the remaining capacity of the memory circuit 140 is not sufficient, a channel detection number of the remote wireless communication apparatuses 120 that the communication circuit 130 performs the channel detection is decreased, i.e., the number n of the remote wireless communication apparatuses 120 is decreased by the processing circuit 150. Further, the corresponding compressed channel state information is removed from the memory circuit 140 so as to clear the memory blocks by the processing circuit 150. After the capacity of the removed memory blocks is sufficient for storing the raw channel state information RCSI, the processing circuit 150 stores the raw channel state information RCSI in the memory circuit 140.

In an embodiment, when the processing circuit 150 does not need the raw channel state information RCSI anymore, the processing circuit 150 removes the raw channel state information RCSI from the memory circuit 140 and restores the channel detection number of the remote wireless communication apparatuses 120 to keep storing the corresponding number of the pieces of the compressed channel state information $CSI_1$~$CSI_n$.

In an embodiment, under a long-term usage, the addresses of the memory blocks in the memory circuit 140 each having a content stored therein may not be continuous. In other words, in the memory blocks having continuous addresses, some of the memory blocks have a content stored therein and some of the memory blocks do not store any content. Under such a condition, the memory blocks are reordered by the processing circuit 150 such that the content is stored intensively in each of the memory blocks having the continuous addresses.

As a result, the wireless communication apparatus 110 of the present invention can store the compressed channel state information in the memory circuit and adjust the channel detection number of the remote wireless communication apparatuses when the capacity of the memory circuit is not sufficient for storing the raw channel state information having the larger data amount, so as to store the raw channel state information. The compressed channel state information and the raw channel state information can therefore be stored in the memory circuit elastically and efficiently to accomplish the memory sharing mechanism.

Figure 3:
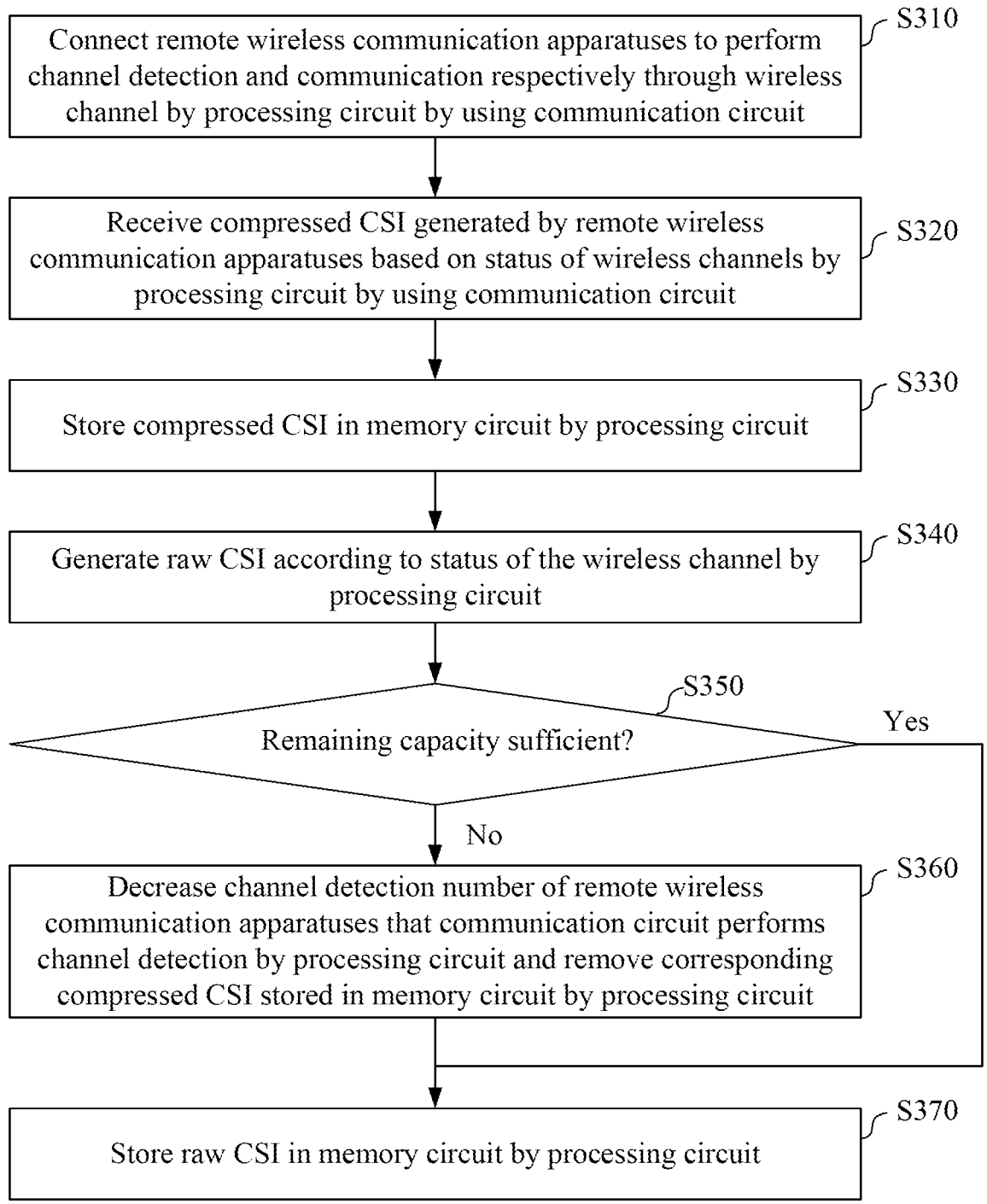
FIG. 3 illustrates a flow chart of a memory sharing method according to an embodiment of the present invention.

Reference is now made to FIG. 3. FIG. 3 illustrates a flow chart of a memory sharing method 300 according to an embodiment of the present invention.

Besides the apparatus described above, the present invention further discloses the memory sharing method 300 that can be used in such as, but not limited to the wireless communication apparatus 110 illustrated in FIG. 1. An embodiment of the memory sharing method 300 is illustrated in FIG. 3 and includes the steps outlined below.

In step S310, the remote wireless communication apparatuses 120 are connected to perform channel detection and communication through the wireless channels $WC_1$~$WC_n$ by the processing circuit 150 by using the communication circuit 130.

In step S320, the pieces of the compressed channel state information $CSI_1$~$CSI_n$ generated by the remote wireless communication apparatuses 120 based on a status of the wireless channels $WC_1$~$WC_n$ are received by the processing circuit 150 by using the communication circuit 130.

In step S330, the compressed channel state information $CSI_1$~$CSI_n$ is stored in the memory circuit 140 by the processing circuit 150.

In step S340, the raw CSI is generated according to a status of the wireless channels $WC_1$~$WC_n$ by the processing circuit 150. In an embodiment, the raw CSI is generated based on channel detection performed on packets transmitted in the uplink channels (from the remote wireless communication apparatuses 120 to the wireless communication apparatus 110).

In step S350, whether the remaining capacity of the memory circuit 140 is sufficient for storing the raw channel state information RCSI is determined by the processing circuit 150.

In step S360, when the remaining capacity of the memory circuit 140 is not sufficient for storing the raw channel state information RCSI, the channel detection number of the remote wireless communication apparatuses 120 that the communication circuit 130 performs the channel detection is decreased by the processing circuit 150 and the corresponding compressed channel state information stored in the memory circuit 140 is removed by the processing circuit 150.

In step S370, when the processing circuit 150 determines that the remaining capacity is sufficient for storing the raw channel state information RCSI in step S350, or when the processing circuit 150 clears the memory circuit 140 in step S360 such that the memory circuit 140 has enough capacity, the raw channel state information RCSI is stored in the memory circuit 140 by the processing circuit 150.

It is appreciated that the embodiments described above are merely an example. In other embodiments, it should be appreciated that many modifications and changes may be made by those of ordinary skill in the art without departing, from the spirit of the invention.

For example, the wireless communication apparatus 110 can be implemented by a station apparatus instead of an access point apparatus. Similarly, each of the remote wireless communication apparatuses 120 can be implemented by an access point apparatus instead of a station apparatus. Further, the structure of the memory circuit 140 and the memory blocks 220 is merely an example. In other embodiments, the memory circuit 140 and the memory blocks 220 can be implemented by using other structures and are not limited by the embodiment illustrated in FIG. 2.

In summary, the wireless communication apparatus having memory sharing mechanism and the memory sharing method of the same of the present invention can store the compressed CSI and the raw CSI in a single memory circuit in an elastic and efficient way to accomplish the memory sharing mechanism.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless communication apparatus having memory sharing mechanism, comprising:
   a communication circuit;
   a memory circuit; and
   a processing circuit configured to execute steps of:
      connecting to a plurality of remote wireless communication apparatuses to perform channel detection and communication respectively through a wireless channel by the communication circuit;
      receiving a plurality of pieces of compressed channel state information (compressed CSI), by the communication circuit, generated by the remote wireless communication apparatuses based on a status of the wireless channel;
      storing the compressed CSI in the memory circuit;
      generating raw channel state information (raw CSI) according to a status of the wireless channel;
      decreasing a channel detection number of the remote wireless communication apparatuses that the communication circuit performs the channel detection when a remaining capacity of the memory circuit is not sufficient, and removing the corresponding compressed CSI stored in the memory circuit; and
      storing the raw CSI in the memory circuit.

2. The wireless communication apparatus of claim 1, wherein the memory circuit comprises a plurality of memory blocks divided into a plurality of memory hierarchies, wherein each of the memory blocks comprised in the N-th memory hierarchy are composed by the memory blocks comprised in the N−1-th memory hierarchy.

3. The wireless communication apparatus of claim 2, wherein each of the raw CSI and the compressed CSI has a data amount, and the data amount of the raw CSI is larger than the data amount of each of the compressed CSI, the processing circuit further performs the steps of:
   selecting the memory blocks having the capacity matching the data amount of the raw CSI and each of the compressed CSI so as to store the raw CSI and the each of the compressed CSI.

4. The wireless communication apparatus of claim 2, wherein each of a plurality of addresses of the memory blocks is labeled as a code having a plurality of bits, the memory blocks in the higher memory hierarchies corresponding to the higher order bits and/or a larger code number, the memory blocks in the lower memory hierarchies corresponding to the lower order bits and/or a smaller code number, and the processing circuit is configured to access the memory circuit according to the code.

5. The wireless communication apparatus of claim 2, wherein the processing circuit further performs the steps of:
   reordering the memory blocks when a plurality of addresses of the memory blocks in the memory circuit each having a content stored therein are not continuous, such that the content is stored intensively in each of the memory blocks having the continuous addresses.

6. The wireless communication apparatus of claim 1, wherein each of the wireless communication apparatus and the remote wireless communication apparatuses is an access point (AP) apparatus or a station apparatus respectively.

7. The wireless communication apparatus of claim 1, wherein the raw CSI is used to perform object displacement detection corresponding to an environment.

8. The wireless communication apparatus of claim 1, wherein the compressed CSI is used to determine a communication quality between the remote wireless communication apparatuses and the wireless communication apparatus.

9. The wireless communication apparatus of claim 1, wherein the compressed CSI is generated by the remote wireless communication apparatuses according to the wireless channel after the processing circuit transmits a driving packet through the communication circuit to the remote wireless communication apparatuses.

10. A memory sharing method used in a wireless communication apparatus, comprising:
    connecting to a plurality of remote wireless communication apparatuses to perform channel detection and communication respectively through a wireless channel by a processing circuit by using a communication circuit;
    receiving a plurality of pieces of compressed CSI, by the processing circuit by using the communication circuit, generated by the remote wireless communication apparatuses based on a status of the wireless channel;
    storing the compressed CSI in a memory circuit by the processing circuit;
    generating raw CSI according to a status of the wireless channel by the processing circuit;
    decreasing a channel detection number of the remote wireless communication apparatuses that the communication circuit performs the channel detection by the processing circuit when a remaining capacity of the memory circuit is not sufficient, and removing the corresponding compressed CSI stored in the memory circuit by the processing circuit; and
    storing the raw CSI in the memory circuit by the processing circuit.

11. The memory sharing method of claim 10, wherein the memory circuit comprises a plurality of memory blocks divided into a plurality of memory hierarchies, wherein each of the memory blocks comprised in the N-th memory hierarchy are composed by the memory blocks comprised in the N−1-th memory hierarchy.

12. The memory sharing method of claim 11, wherein each of the raw CSI and the compressed CSI comprises a data amount, and the data amount of the raw CSI is larger than the data amount of each of the compressed CSI, the memory sharing method further comprises:
    selecting the memory blocks having the capacity matching the data amount of the raw CSI and each of the compressed CSI so as to store the raw CSI and the each of the compressed CSI by the processing unit.

13. The memory sharing method of claim 11, wherein each of a plurality of addresses of the memory blocks is labeled as a code having a plurality of bits, the memory blocks in the higher memory hierarchies corresponding to the higher order bits and/or a larger code number, the memory blocks in the lower memory hierarchies corresponding to the lower order bits and/or a smaller code number, and the processing circuit is configured to access the memory circuit according to the code.

14. The memory sharing method of claim 11, further comprising:
    reordering the memory blocks when a plurality of addresses of the memory blocks in the memory circuit each having a content stored therein are not continuous by the processing circuit, such that the content is stored in each of the memory blocks having the continuous addresses.

15. The memory sharing method of claim 10, wherein each of the wireless communication apparatus and the remote wireless communication apparatuses is an access point (AP) apparatus or a station apparatus respectively.

16. The memory sharing method of claim 10, wherein the raw CSI is used to perform object displacement detection corresponding to an environment.

17. The memory sharing method of claim 10, wherein the compressed CSI is used to determine a communication quality between the remote wireless communication apparatuses and the wireless communication apparatus.

18. The memory sharing method of claim 10, wherein the compressed CSI is generated by the remote wireless communication apparatuses according to the wireless channel after the processing circuit transmits a driving packet through the communication circuit to the remote wireless communication apparatuses.

* * * * *